United States Patent [19]
Hornung

[11] 3,752,237
[45] Aug. 14, 1973

[54] PRESS WHEEL ASSEMBLY

[76] Inventor: Michael C. Hornung, Spearville, Kans. 67876

[22] Filed: Mar. 20, 1972

[21] Appl. No.: 236,208

Related U.S. Application Data

[63] Continuation of Ser. No. 861,635, Sept. 29, 1969, abandoned.

[52] U.S. Cl. .............................. 172/531, 172/538
[51] Int. Cl. ............................................. A01b 5/00
[58] Field of Search................... 172/538, 531, 560, 172/575, 551, 559, 578, 174, 184, 185, 175; 111/88, 85

[56] References Cited
UNITED STATES PATENTS
2,357,760  9/1944  Peacock.............................. 111/85
530,962   12/1894  Packham ........................... 172/538

Primary Examiner—Robert E. Pulfrey
Assistant Examiner—R. T. Rader
Attorney—John H. Widdowson

[57] ABSTRACT

This invention relates to a press wheel means to be mounted upon a cultivating implement utilized in a seed planting process. More particularly, this invention is an improved press wheel assembly having cooperating half wheel assemblies loosely mounted upon a main support shaft and constructed so as to create a constant wobbling or vibrating effect to maintain the same free and clear of mud and the like.

3 Claims, 8 Drawing Figures

Patented Aug. 14, 1973 3,752,237

INVENTOR.
MICHAEL C. HORNUNG

BY
John H. Widdowson
ATTORNEY

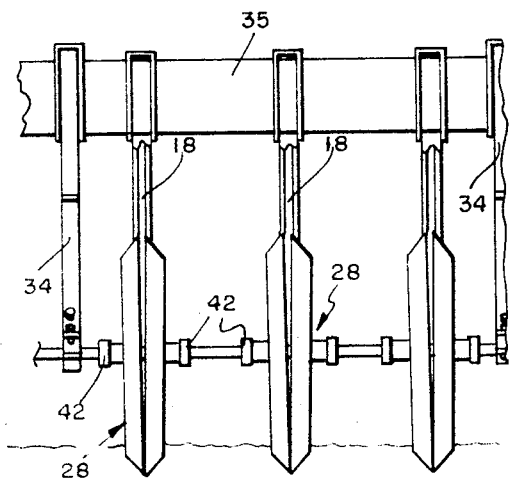
FIG. 6
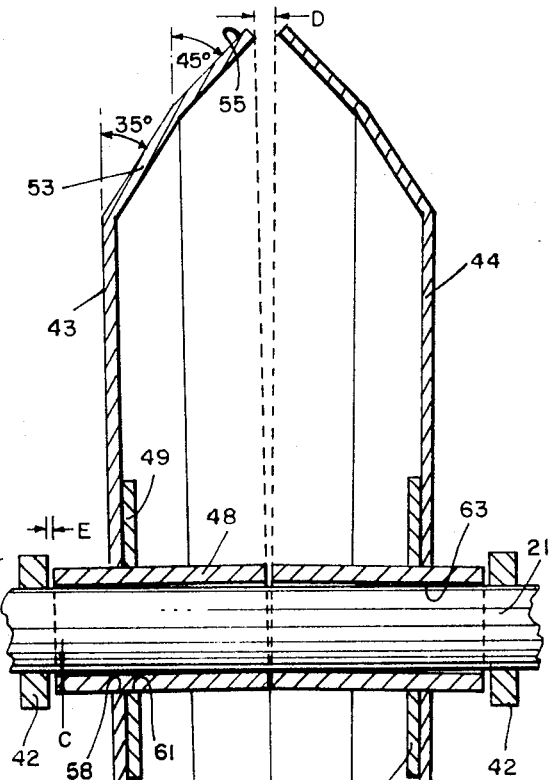
FIG. 5
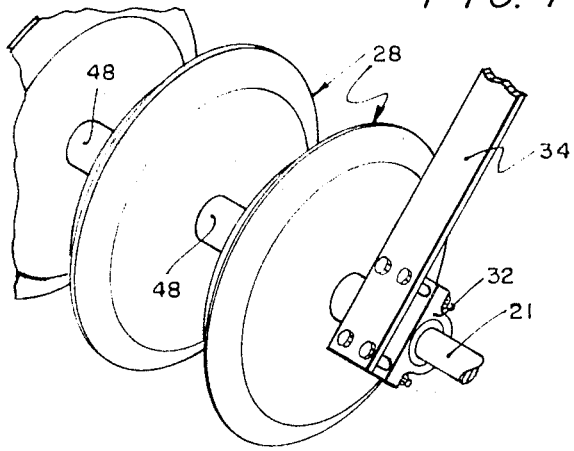
FIG. 7
FIG. 8

PRESS WHEEL ASSEMBLY

This is a continuation of application Ser. No. 861,635, filed Sept. 29, 1969, now abandoned.

Numerous types of farm implements are known to the prior art operable to provide a harrowing function for dropping seeds into certain rows and then covering the same by a wheel assembly. However, it is noted that the prior art devices are substantially complicated in structure therefore expensive to manufacture and not operable in a self-cleaning manner.

In one preferred embodiment of this invention, a press wheel means is provided for attachment to a cultivating implement so as to be cooperatively positioned relative to a seed feed assembly and a harrow assembly for proper farming operations. More particularly, the press wheel means includes a plurality of press wheel assemblies mounted in spaced relationships upon a main support shaft and held thereon for confined movement between cooperating retainer members. Each press wheel assembly includes a pair of half wheel assemblies mounted upon the support shaft in facing relationship so as to form a disc like structure. Each half wheel assembly includes a main body portion of plate shape secured centrally to one end of a main support hub as by welding and having a large washer or plate member thereagainst. The main body is of an irregular shape having a flat central portion integral with outwardly inclined intermediate sections and end sections. The support hub is of a cylindrical shape of an inner diameter greater than the support shaft for proper operation thereof. The reinforcing plate member is secured to the inner side of the main body against the same and also to the support hub. The outer end of each support hub is adapted to contact the adjacent retainer member whereas the inner portion thereof is of a length slightly greater than the combined height of the intermediate section and outer end section for proper operation thereof. The proper relationship of the outer end sections of the main body; the length of the inner portion of the support hubs; the positioning of the retainer members; and the relative clearance between the support shaft and the support hubs are all co-related and important to achieve the new and novel operation of this invention.

One object of this invention is to provide an improved press wheel means overcoming the aforementioned disadvantages of the prior art structures.

Still, one further object of this invention is to provide a press wheel means whereupon a plurality of press wheel assemblies are mounted in a pre-determined spaced relationship upon a main support shaft operable to press the seeds within the ground in a planting operation through a cultivating implement and having new and novel features for making the same self-cleaning.

Still, one further object of this invention is to provide an improved press wheel assembly having cooperating half wheel assemblies rotatably mounted upon the main support shaft and engagable with the soil to cause a fluttering action to assure the self-cleaning properties.

One further object of this invention is to provide an improved press wheel means which is simple to use, economical to manufacture, substantially maintenance free, and providing self-cleaning properties.

Various other objects, advantages, and features of the invention will become apparent to those skilled in the art, from the following discussion. taken in conjunction with the accompanying drawings, in which:

FIG. 5 is an enlarged sectional view of a press wheel assembly of this invention;

FIG. 6 is a fragmentary rear elevational view illustrating the working condition of the plurality of the press wheel assemblies of this invention;

FIG. 7 is a view of the cultivator implement of this invention raised to the non-usage condition showing the movement of the press wheel assemblies to their normal condition; and FIG. 8 is a fragmentary perspective view illustrating the mounting of the improved press wheel means of this invention.

Figure 1:
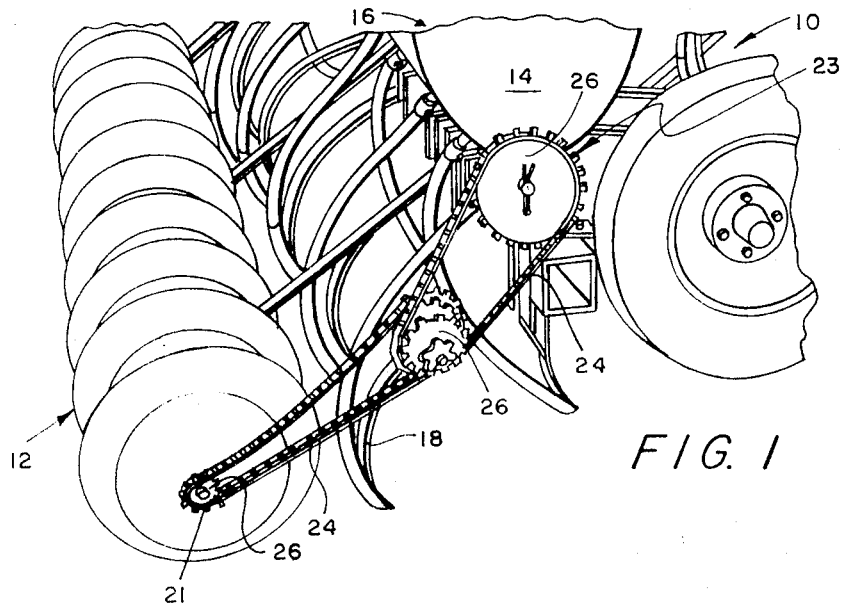
FIG. 1 is a fragmentary perspective view of a cultivating implement having the press wheel means of this invention mounted thereon.

The following is a discussion and description of preferred specific embodiments of the new improved press wheel means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a perspective view of a cultivator implement 10 is shown as having a press wheel means indicated generally at 12 mounted thereon. More particularly, the cultivator implement 10 is provided with a seed or chemical storage tank 14 being a portion of a feed assembly 16; a plurality of harrow tooth assemblies 18 in order to prepare the soil for dropping the seed members or chemical within; and the press wheel means 12 mounted therebehind upon a main elongated support shaft 21. It is seen that the feed assembly 16 includes a drive assembly 23 having a plurality of interconnected chain members 24 and sprocket members 26 which are operable through a ground contacting wheel (not shown) to rotate the support shaft 21. The rotating support shaft 21 operates to provide the desired feed of material through the feed assembly 16 relative to the ground speed of the entire cultivator implement 10. More particularly, the press wheel means 12 includes a plurality of individually spaced press wheel assemblies 28 rotatably mounted about the support shaft 21 positioned in a pre-determined relationship to the respective harrow tooth assemblies 18 to achieve the function of this invention. In one embodiment, three adjacent ones of the press wheel assemblies 28 may be positioned, so that the outer ones cooperate with a respective harrow tooth assembly 18 and the central press wheel assembly 28 would then act as a deflection shield to prevent the throwing of excessive soil over the planted seed if such is deemed necessary.

Figure 2:
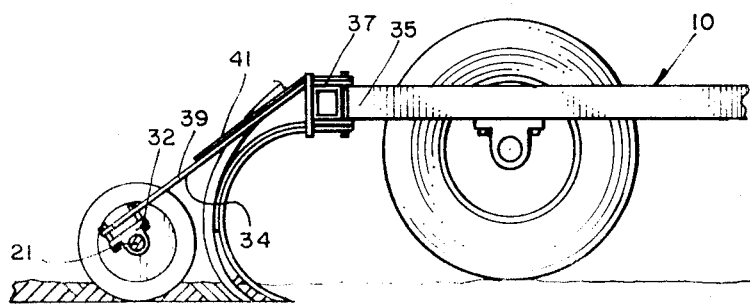
FIG. 2 is a fragmentary side elevational view of the cultivating implement showing the improved press wheel means of this invention in an operating condition.

As shown in FIGS. 2 and 8, it is seen that the support shaft 21 is mounted through bearing members 32 connected to irregular shaped support arms 34 which, in turn, are secured to a main frame 35. The support arms 34 includes a base section 37 secured to the main frame 35 and an integral inclined leg section 39 with its outer end connected to the support shaft 21. The leg section 39 provides the desired flexibility and positioning relative the harrow tooth assemblies 18. An additional rigid plate 41 is mounted against the upper surface of the base section 37 and the leg section 39 to provide the desired working depth and resiliency to the press wheel means 12.

Each press wheel assembly 28 is constructed of a pair of half wheel assemblies 43 and 44 mounted about the support shaft 21 and held in a predetermined relationship thereon by retainer members 42 secured to the support shaft 21 through set screws or the like. As the half wheel assemblies 43 and 44 are substantially identical, only one need be described in detail.

The half wheel assembly 43 includes a main body 46 secured to a central support hub 48 and having a reinforcing plate or washer 49 secured thereagainst. More particularly, the main body 46 includes a central section 51 with an integral outwardly extended intermediate section 53 and an outer end section 55. It is noted that the intermediate section 53 extends outwardly relative to the base or central section 51 at an angle approximately 35° whereupon the outer end section 55 extends at a similar angle of approximately 45° for reasons to become obvious. The main body 46 is provided with a central hole 58 to receive the support hub 48 therethrough and welded thereagainst about its periphery. The reinforcing washer 49 also has a central hole 61 placed about the support hub 48 and against the inner surface of the main body 46 and welded thereto. The reinforcing washer 49 is provided to give additional overall rigidity to the main body 46.

The support hub 48 is of a cylindrical shape having a central opening 63 to receive the support shaft 21 therewithin. The support hub 48 is provided on its inner-most side with a pre-determined length indicated at "A" in FIG. 5 relative to the height of the main body 46 indicated at "B". In fact, the operational characteristics of this invention is dependent upon certain dimensional and size relationships of the various elements such as (1) the clearance between the support shaft 21 and the respective support hubs 48; (2) the clearance provided between the support hubs 48 and the retainer members 42; and (3) the aforementioned difference in overall height between the inner section of the support hub 48 and the main body 46.

Figure 3:
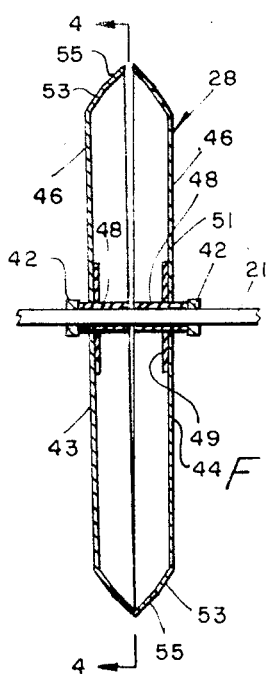
FIG. 3 is a sectional view of an improved press assembly of this invention.
Figure 4:
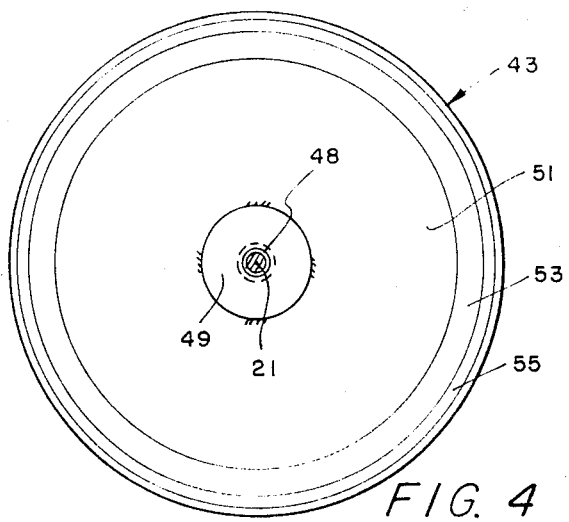
FIG. 4 is a sectional view taken along line 4—4 in FIG. 3.

In the use and operation of the press wheel means 12 of this invention, it is seen that a plurality of the improved press wheel assemblies 28 are rotatably mounted in a spaced relationship on the main support shaft 21 in a pre-determined position behind respective ones of the harrow tooth assemblies 18. It is seen that the press wheel assemblies 28 thereupon act to depress the seeds as required and to cover up the seeds which are being planted by the cultivator implement 10. As best shown in FIG. 5, it is obvious that on movement of the cultivator implement 10 over the ground after lowering the harrow assemblies 18 and the press means 12, it is obvious that the contact with the soil will cause rotation of the press wheel assemblies 28. Also due to the outer contour of the main bodies 46 of the half wheel assemblies 43, 44, it is obvious that the same forces the outer tips thereof inwardly to the position shown in FIGS. 3 and 5. However, due to the clearance indicated at "C" between the support hub 48 and the outer diameter of the support shaft 21, it is obvious that this in combination with the length "A" of the support hub 48 being greater than the length "B" of the respective half wheel assemblies 43, 44, causes mating of the lower edges and splitting of the upper edges. It is obvious that this amount of maximum split at the top indicated at "D" is mainly controlled through the clearance between the support shaft 21 and the support hub 48 plus the respective lengths "A" of the support hub 48. However, there must be a clearance between the retainer members 42 and the support hubs 48 indicated at "E" equal to or greater than "C" for proper operation.

It is seen that these spaced relationships causes a continuous wobbling movement of the half wheel assemblies 43, 44, throughout the rotation on the support shaft 21 so as to cause the same to be constantly vibrating and self-cleaning which is extremely desirable.

It is noted that the improved press wheel assemblies of this invention may be mounted upon a given support shaft at any desired interval to provide the numerous desirable features of this invention. The improved press wheel means of this invention is economical to manufacture, simple to use, rigid in construction, and having the desirable characteristics of being self-cleaning.

While the invention has been described in conjunction with preferred specific embodiments thereof, it will be understood that this description is intended to illustrate one embodiment of this invention, which is defined by the following claims.

I claim:

1. In combination with a cultivating implement having a plurality of spaced harrow tooth assemblies, a press wheel means, comprising:
    a. a press wheel assembly rotatably mounted on a straight support shaft positioned adjacent and rearwardly of a harrow tooth assembly,
    b. said press wheel assembly having a pair of cooperating half wheel assemblies held in a predetermined position on said support shaft by retainer members, said half wheel assemblies cooperating to form a split disc shape each freely rotatable on contact with the ground,
    c. each of said half wheel assemblies having a main body secured to a support hub, the width of said main body and a portion of said support hub extended in the same axial direction, and said portion of said support hub of a length greater than said width of said main body to provide a space between adjacent outer peripheral edges of said half wheels when said hubs are in full abutment, and said support hubs loosely mounted on said support shaft in a manner whereby said half wheel assemblies can be pivoted on said support shaft to contact each other in an outer portion with opposite outer portions spaced apart substantially and when in such contact first portions of said hubs substantially out of contact with said support shaft and second portions of said hubs in contact with said support shaft, and
    d. said half wheel assemblies upon rotation in contact with the ground of a furrow exerting pressure on the outside of said wheel assemblies, the lower portions thereof being in contact and said wheel assemblies having portions being apart and appreciably out of contact when same are out of the furrow to result in a flexing action and thereby break loose moist soil which has clung to said half wheels.

2. A press wheel means as described in claim 1, including:
  a. a flexible arm member connected to said implement and one end connected to bearing members having said support shaft mounted therein, said arm member having a rearwardly, downwardly inclined leg section to maintain a spring pressure against said press wheel assembly for proper action when contacting the soil.

3. A press wheel means as described in claim 1, wherein:
  a. said main body having a central section integral with outwardly extended intermediate section and outer end section, and
  b. said outer end sections extended 45° to said central sections, and cooperating ones of said end sections on adjacent ones of said half wheel assemblies form an angle of 90° therebetween and are engagable with the soil at approximately 45°.

* * * * *